Oct. 16, 1962     C. L. SPORCK ETAL     3,058,205
LIGHTWEIGHT PLURALITY OF GENERALLY
CONICAL, HOLLOW, METALLIC OBJECTS
Filed Feb. 28, 1955     2 Sheets-Sheet 2
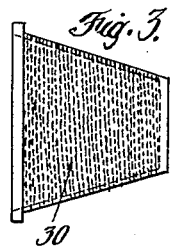
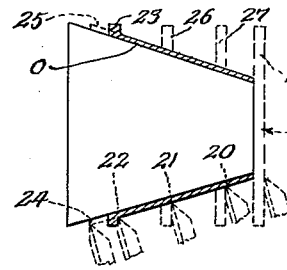
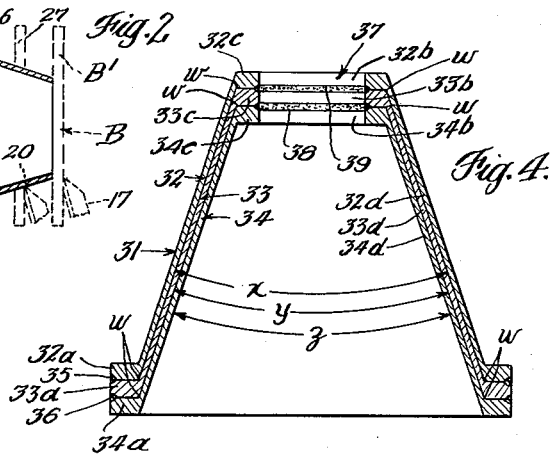
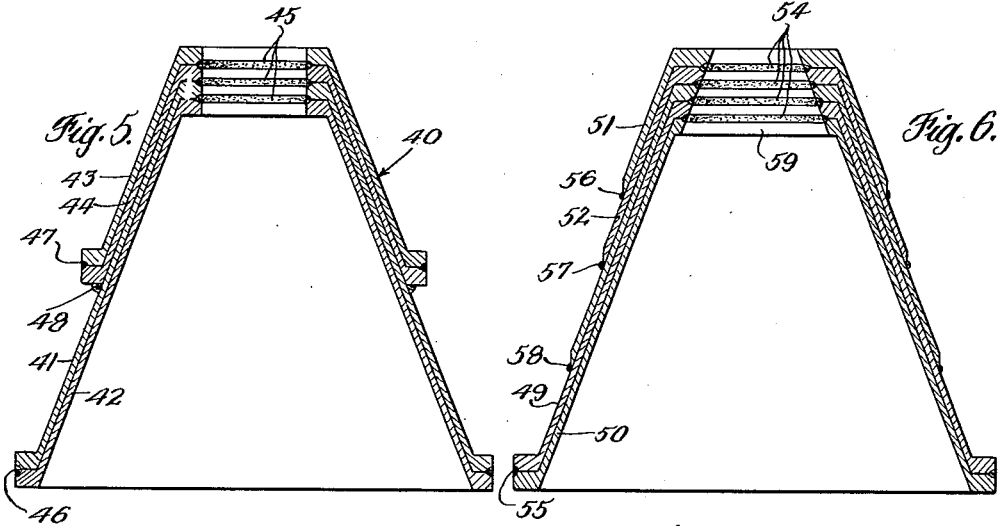
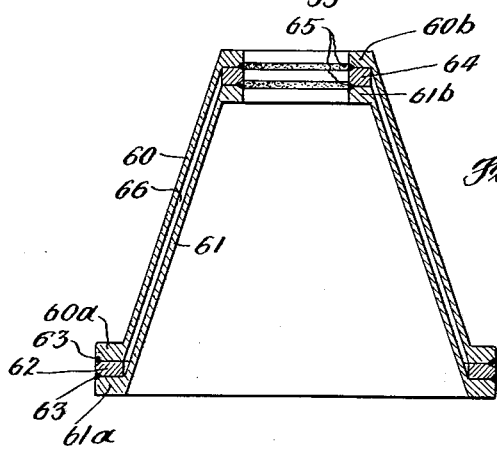

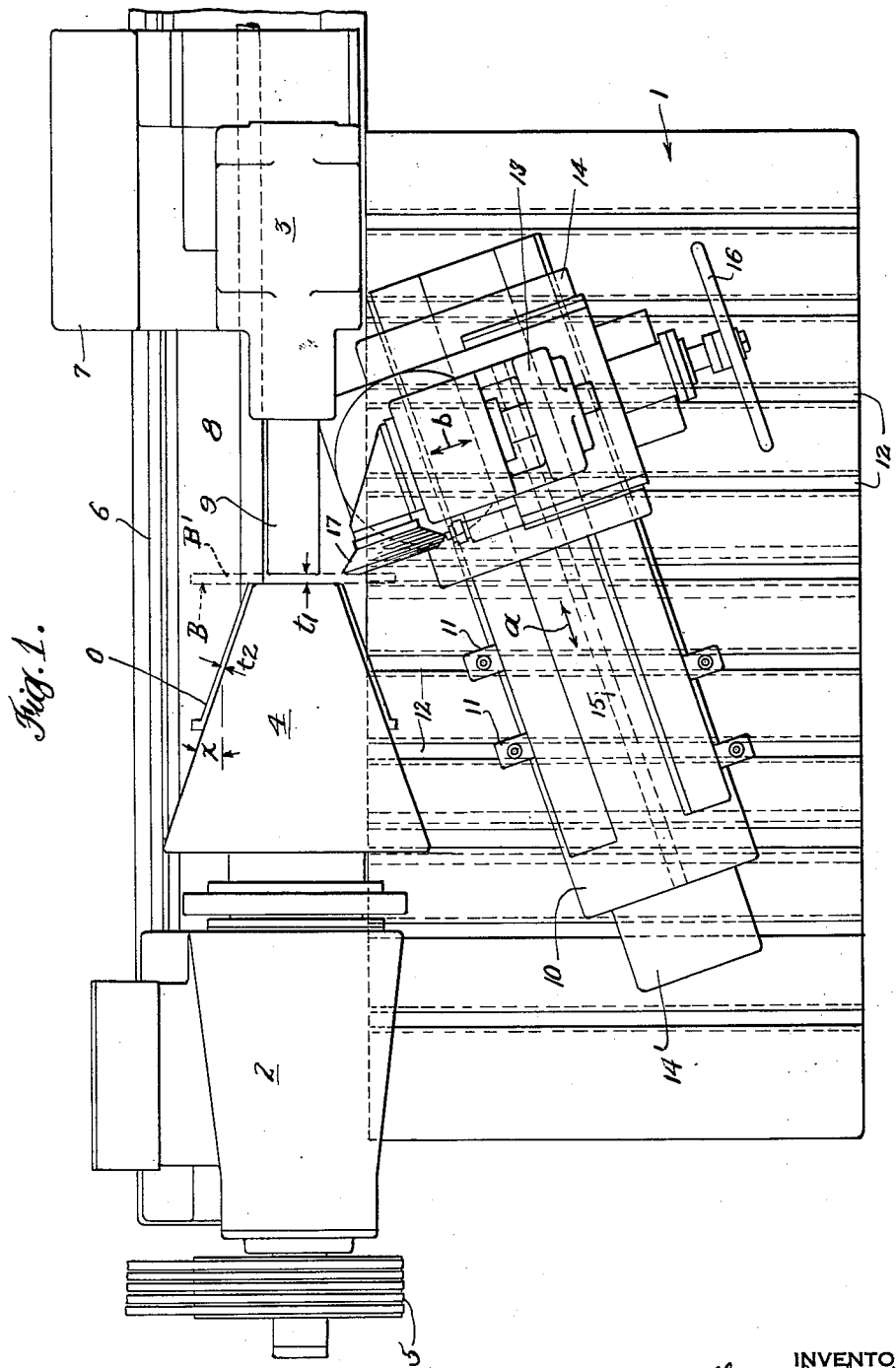

United States Patent Office 3,058,205
Patented Oct. 16, 1962

3,058,205
LIGHTWEIGHT PLURALITY OF GENERALLY CONICAL, HOLLOW, METALLIC OBJECTS
Claus L. Sporck and Bernard Sassen, Cincinnati, Ohio, assignors to The Lodge & Shipley Company, Cincinnati, Ohio, a corporation of Ohio
Filed Feb. 28, 1955, Ser. No. 490,792
2 Claims. (Cl. 29—183)

This invention relates in general to the manufacture of high-strength, low-cost, lightweight metal articles particularly suitable for use as components in air-borne devices.

The articles of the invention are made up in layer or sandwich form by a plurality of hollow, generally conical-shaped objects connected together into a unified rigid structure, each object having sides of the same included angle and a refined grain structure running in helix-like form, the axis of which extends in a direction generally along the axis of the article. Certain of the methods disclosed in copending application of Claus L. Sporck, Serial No. 407,010, filed January 29, 1954, now abandoned, and entitled Methods for Working Sheet Metal, are usable in the practice of the present invention.

For the power plant of aircraft, both military and commercial, the design trend today is toward the use of jet devices. It is of utmost importance that the various components making up a jet be light in weight and exceptionally rugged; certain other parts, for example, the exhaust cone, must not only have the foregoing qualities but, in addition, must be capable of operating under extremely high temperatures. These qualities are also required in parts for military gear such as a rocket or a guided missile, particularly in the flame or exhaust cone thereof.

Heretofore, such exhaust or flame cones have been constructed by forging and machining and in certain instances, by deep drawing and machining. It will be appreciated that the manufacture of such cones by forging and machining is costly because of the expensive equipment, shop and labor time required and the waste of metal in the machining operation. Deep drawing and machining have similar disadvantages but, in addition, manufacture by this method is limited to relatively small size cones. Both of these methods have a further disadvantage in that it is virtually impossible to work the grain structure so that maximum ultimate strength is obtained.

The principal object of the present invention is to provide an article of manufacture, such as a cone of the type mentioned, which is very inexpensive to produce because of savings in shop and labor time and material, yet is light in weight, with grain structure providing for optimum strength and, with certain adaptations, capable of withstanding very high temperatures.

While the articles of the invention have been mentioned in connection with exhaust and flame cones, it will be apparent from the description hereinafter that many other uses are possible even in those instances where good resistance to high temperature is not required.

The manner in which the articles of the invention are constructed and certain advantages thereof will be apparent from the following description and drawings wherein:

FIGURE 1 is a plan view of a machine capable of making certain of the components making up an article of the invention;

FIGURE 2 is a view showing one manner in which objects making up articles of the invention are formed;

FIGURE 3 is a view of a typical component of an article of the invention showing the general orientation of the grain structure thereof;

FIGURES 3a and 3b are views illustrating the difference in grain structure of an original blank and a formed object;

FIGURES 4, 5, 6 and 7 are views illustrating typical embodiments of the articles of the invention.

In FIGURE 1 the base 1 carries a head stock 2 and a tail stock 3. A spindle or mandrel 4 is rotatably mounted on the head stock, the rotation being imparted by drive means including the belt 5 connected to a power source (not shown). The tail stock 3 is mounted on the bed 6 in a manner to be movable toward and away from the spindle 4, the power for this movement being supplied by certain hydraulic mechanism located within the portion 7 and connected to a screw mechanism 8 mounted in the bed. The tail stock carries a plunger or clamp 9 rotatably mounted thereon, which is movable relative to the tail stock in a direction toward and away from the spindle. The plunger is actuated by certain hydraulic mechanism located within the portion 7. The function of the plunger is to clamp a blank B securely against the spindle.

Also mounted on the base is an orientable support 10 which is connected to the base so that it can be adjusted or oriented in a desired manner with respect to the spindle 4. The support can be fixed in position by the clamps 11 slidably mounted in the T-slots 12—12. A roller rest 13 is carried by a table 14 mounted on the support 10 to be movable in the direction shown by arrows $a$. Driving power for the table and roller rest along the support is provided by certain hydraulic mechanism within the portion 14' which operates nut and screw mechanism 15 appropriately connected with the table. The table also has means whereby the roller rest may be moved in a direction indicated by the arrow $b$, this movement being effected by manipulation of the handwheel 16. The roller rest 13 rotatably mounts a roller 17.

The roller rest above mentioned is described in copending application of Claus L. Sporck, Serial No. 462,695, filed October 18, 1954, and entitled Metal Working (now abandoned), and a typical roller is described in copending application of Claus L. Sporck, Serial No. 462,875, filed October 18, 1954, and entitled Metal Working, now Patent 3,029,764.

A general description of the manner in which a machine such as described above can be used for forming objects usable in making up the articles of the invention follows.

The desired dimensions of a hollow, generally conical-shaped object such as indicated at O in FIGURE 1 are known, for example, the thickness $t_2$ and the angle of taper $x$. These values of $t_2$ and $x$ are substituted into the formula $t_1 = t_2$ sine $x$ to obtain the thickness $t_1$ of the blank. The blank is preferably disk-like, having a diameter substantially equal to the maximum outside diameter of the desired object or cone. The support 10 and the roller rest 13 are adjusted so that the roller can be moved along a path parallel to the surface of the spindle at a distance therefrom corresponding to $t_2$. The blank is clamped on the spindle by the tail stock, the spindle rotated, and the roller 17 moved as mentioned.

The effect of this rolling operation is to axially displace metal in the blank, i.e., the metal in the annular portion B' is reduced in thickness and lengthened into the sides forming the object or cone. The configuration of the blank as it is axially displaced for various roller positions along the spindle surface is indicated by numerals 20, 21 and 22 in FIGURE 2. It will be noted that as the portion B' is progressively reduced, the outside diameter remains substantially equal to the original diameter of the bank.

Preferably, the roller 17 is stopped at such a point that the object has a small annular shoulder 23 remaining around the mouth thereof. However, if the roller is made to move along to the point 24, the cone will be formed without a shoulder, i.e., the sides extend as indicated by the dotted lines 25. As will be apparent, the roller can be made to travel different distances so that the cone formed has an annular shoulder as indicated by the dotted lines at 26 or at 27.

The axial displacement of a blank into a hollow object may be effected by any of the methods disclosed in copending application Serial No. 407,010 referred to above, as will be readily apparent from an inspection of that application. Where the blank is displaced in accordance with the relationship $$T_1 = T_2 \frac{\text{sine } \alpha}{\text{sine } \beta}$$

as disclosed in that application, the annular shoulder around the mouth or wide edge may be oriented at an angle other than 90° with the axis of the object. In some instances, it may be desirable to have the shoulder oriented in this manner, and so the method of axial displacement is ideally suited for this purpose. However, where it is desired that the shoulder be at substantially right angles with the axis, this can be accomplished by a press operation or the like.

The effect of the operation is to orient the grain structure of the metal in a manner which is conducive to high strength characteristics. As one example of the high strength imparted, it is pointed out that in one instance, the tensile strength of #302 stainless steel was doubled.

The rotation of the blank while the roller is being moved along the surface of the spindle causes the grain structure of the metal to be refined and to run in helix-like form in a direction generally along the axis of the object. This is somewhat diagrammatically illustrated in FIGURE 3, where the small dotted lines 30 represent the grain structure. The particular orientation or helix angle generally depends upon the rotational speed of the blank and the rate at which the roller moves. The direction (i.e., the sense) of the helix angle can be reversed from that shown by utilizing a reverse direction of rotation of the blank in the forming operation.

FIGURES 3a and 3b respectively represent microstructures of the material of the original blank and that of the flowed metal. It will be observed that in FIGURE 3a the grains are large and randomly oriented while in FIGURE 3b the grains are refined and run generally in the same direction.

The description that follows concerns the manner in which objects made as above described are arranged to form unified rigid, high-strength, lightweight articles.

In FIGURE 4 an article 31 comprises three identical objects 32, 33 and 34, which are arranged together in layer or sandwich-like form. The annular shoulders 32a, 33a and 34a at the wide edge of the object are joined together by welds 35 and 36. At the narrow edge, each object is provided respectively with holes 32b, 33b and 34b, which together form the aperture 37 of the article, and the annular shoulders 32c, 33c and 34c are joined together by welds 38 and 39. The annular shoulders, together with the welds mentioned above, ideally serve as a means of connecting the object together in rigid form and also serve as strengthening members. In some instances, the shoulders may be eliminated and the objects joined by welds placed as indicated by w—w. The holes 32b, 33b and 34b are preferably made when the blank for making the object is formed. It is to be observed that the included angles x, y and z (as measured between the inner surface of the sides 32d, 33d and 34d) are equal to each other.

In forming the article of FIGURE 4, the objects 32 and 34 may be made so that the sides 32d, 33d and 34d have grain structure running in the same direction, while the object 33 is made with the grain structure running in the opposite direction. This arrangement serves to enhance the over-all strength of the article.

The objects 32, 33 and 34 can be made from different material, depending upon the particular intended application. For example, where the article is to be used as a flame cone, the object 34 can be made from metal which is highly resistant to direct flame or heat (which ordinarily is relatively expensive), while the objects 32 and 33 can be made from less expensive metal. By way of another example, if the particular application requires exposure to weather, the object 32 can be manufactured from metal which is non-corrosive. Also, the article can be made from objects having respectively different thermal conductivities where that arrangement is desired.

In FIGURE 5 I have shown another article wherein the greater mass is concentrated near the narrow portion. The article 40 comprises two objects 41 and 42 which are identical in construction, and objects 43 and 44 which, although they have the same included angle as objects 41 and 42, are somewhat shorter in length. At the narrow end or edge, the objects are all joined together by welds 45 and the shoulders at the wide end on objects 41 and 42 are joined together by welds 46. The shoulders on objects 43 and 44 are joined together by welds 47, and weld 48 joins objects 44 and 41 to complete the unified structure.

This type of article is particularly useful in those instances where it is subjected to very high rotational speeds where, for strength purposes, it is important that considerable mass be concentrated in the narrow portion of the article. Thus, by having less mass in the wider section of the article, the gyroscopic effects of a rotating mass are considerably reduced. It is to be noted that the annular shoulders 43a and 44a serve as strengthening members and that the article may be made from different metals in a manner mentioned in connection with the article 31.

The article in FIGURE 6 is suitable for purposes similar to those of article 40 of FIGURE 5 and comprises the objects 49 and 50, together with the objects 51, 52 and 53. All of the objects have the same included angle, but with the objects 51, 52 and 53 being respectively of shorter length. At the narrow end or edge, all of the objects are connected together by the welds 54—54, and at the wide end, the objects 49 and 50 are connected together by the weld 55. The welds 56, 57 and 58 respectively interconnect the objects 51 and 52, 52 and 53, and 53 and 49.

With the arrangement of FIGURE 6, it will be seen that the general effect is to provide a general taper in the thickness of the sides of the article. Also, it should be noted that the aperture 59 has been tapered, for example, by machining before making the welds 54. Any of the apertures of the articles described herein can be similarly tapered.

FIGURE 7 shows an article comprising objects 60 and 61, which are identical in construction. At the wide edge, annular shoulders 60a and 61a are separated by a ring 62, the shoulders and ring being joined together by welds 63. At the narrow edge, the shoulders 60b and 61b are separated by a ring 64, and these elements are joined together by welds 65. As will be apparent, the rings 62 and 64 provide a space 66 between the objects which can serve as an insulating barrier and, if desired, be filled with insulating material. Also, the structure can be utilized for forming an article having relatively thick sides but with an absolute minimum of weight.

In any of the objects making up an article mentioned herein, the thickness of the several objects to be assembled may be the same or may vary, depending generally on the intended use of the article.

Among the important advantages of the invention is that these rugged light weight articles can be formed at a very rapid rate. For example, an object of #302 stainless steel having an included angle of 34°, an axial length of 30″, and side thickness of .050 can be made starting from a flat or cup-shaped blank in 3 to 6 minutes. When three of such objects are formed and fitted together as shown in FIGURE 2, the welding can be accomplished in 5 to 10 minutes.

Another important advantage is that a wide variety of articles formed from objects of different shapes or construction can be made without highly specialized tools or equipment. For example, all of the objects going into the article of FIGURE 6 have the same included angle; hence, the same spindle and roller can be used even though some of the objects have different lengths.

Another important advantage is that articles can be made with portions thereof suitably adapted for some functional purpose, while the rest of the article is made to suit another functional purpose. For example, when one part of an article must be heat or corrosion-resistant or have a particular thermal conductivity and the other part need not have these characteristics, this latter can be made with less expensive or easier to form metal, and a thinner layer of the higher-cost metal may be used.

We claim:

1. A lightweight article of manufacture comprising a plurality of generally conical, hollow, metallic objects, the grain structure of the sides thereof being arranged in helix-like form in a direction generally along the axis of the object, the sides of each object having the same included angle and the objects being arranged with respective sides substantially adjacent one another in sandwich-like form and the grain structure of adjacent objects being oriented in opposite directions.

2. A lightweight article of manufacture comprising a plurality of generally conical, hollow, metallic objects, the grain structure of the sides thereof being arranged in helix-like form in a direction generally along the axis of the object, the sides of each object having the same included angle and the objects being arranged with respective sides substantially adjacent one another in saidwich-like form and the axial length of each object being different whereby the composite article has generally tapering sides.

References Cited in the file of this patent

UNITED STATES PATENTS

| | | |
|---|---|---|
| 1,468,748 | Schuman | Sept. 25, 1923 |
| 2,048,598 | Christansen | July 21, 1936 |
| 2,106,527 | Hostetter | Jan. 25, 1938 |
| 2,493,633 | Mart | Jan. 3, 1950 |
| 2,496,351 | Mazzoni | Feb. 7, 1950 |
| 2,710,523 | Purvis | June 14, 1955 |
| 2,790,304 | Besserer | Apr. 30, 1957 |

FOREIGN PATENTS

| | | |
|---|---|---|
| 344,473 | Great Britain | Mar. 4, 1931 |
| 436,768 | Great Britain | Oct. 17, 1935 |